United States Patent [19]

Blanding

[11] Patent Number: 4,996,563
[45] Date of Patent: Feb. 26, 1991

[54] SUPPORT MEANS FOR ELECTROPHOTOGRAPHIC FILM CORE AND ASSOCIATED ELEMENTS

[75] Inventor: Douglass L. Blanding, Rochester, N.Y.

[73] Assignee: Eastman Kodak Company, Rochester, N.Y.

[21] Appl. No.: 420,078

[22] Filed: Oct. 11, 1989

[51] Int. Cl.⁵ .......................................... G03G 21/00
[52] U.S. Cl. ................................. 355/212; 198/806; 226/20; 226/21; 242/57.1; 355/207; 358/296
[58] Field of Search ............... 355/203, 207, 212, 72; 226/15-21, 45; 198/806-807; 242/57.1; 346/296, 300

[56] References Cited

U.S. PATENT DOCUMENTS

| | | | |
|---|---|---|---|
| 3,225,988 | 12/1965 | Drenning | 226/19 |
| 3,232,547 | 2/1966 | Thiede et al. | 242/57.1 |
| 3,317,101 | 5/1967 | Himrod et al. | 242/57.1 |
| 3,540,571 | 11/1970 | Morse et al. | 198/806 |
| 4,077,579 | 3/1978 | Seleski et al. | 242/57.1 |
| 4,429,985 | 2/1984 | Yokota | 355/212 |
| 4,462,676 | 7/1984 | Shimura et al. | 355/212 X |
| 4,483,607 | 11/1984 | Nagayama | 355/212 |
| 4,547,059 | 10/1985 | Nagayama et al. | 355/212 |
| 4,572,417 | 2/1986 | Joseph et al. | 198/807 X |

*Primary Examiner*—A. T. Grimley
*Assistant Examiner*—Matthew S. Smith
*Attorney, Agent, or Firm*—Robert L. Randall

[57] ABSTRACT

A film core supporting structure for an electrophotographic copying or printing machine. The supporting structure includes a two-point suspension system near a roller in the film core and a yoke assembly supporting the film core near another roller. A one-point supporting system is used to support the yoke and restrict its movement in only one dimension. Toner stations are attached to the film core and a drum is supported by the two-point suspension system. A write-head is connected to the yoke. The overall supporting structure prevents distortion of the machine frame from imparting distortive forces through the supporting structure to the film core.

5 Claims, 3 Drawing Sheets

SUPPORT MEANS FOR ELECTROPHOTOGRAPHIC FILM CORE AND ASSOCIATED ELEMENTS

BACKGROUND OF THE INVENTION

1. Cross-Reference to a Related Application

Reference is made to commonly assigned copending U.S. Pat. application Ser. No. 420,000, filed simultaneously herewith in the name of Douglass L. Blanding and entitled ELECTROPHOTOGRAPHIC ƒFILM CORE DEVICE.

2. Field of the Invention

The present invention relates to electrophotographic copying or printing machines and, more particularly, to means for supporting a film core and the elements directly associated therewith.

3. Description Relative to the Prior Art

Many electrophotographic copiers or printers employ an endless photoconductor belt rather than a photoconductor drum and the device that carries the photoconductor belt, including the belt-supporting rollers, commonly referred to as a film core.

As is well known in the prior art relating to electrophotographic copying or printing machines, each transverse region of the photoconductor belt moves successively past a number of stations, which typically include: a charging station where an electrical charge is applied; an exposure station where an image is focused on the belt to selectively discharge the electrical charge and produce a corresponding electrostatic image on the belt; a toning station where a toner material is applied to the belt to produce a toned image; a transfer station where the toned image is transferred to a receiver sheet or web; and, a cleaner station where the belt is cleaned and electrically neutralized in preparation for the next operational cycle. In some cases, such as color copiers, several toner stations are employed and the process is repeated to superimpose different colored images on the receiver.

In such a machine, it is important for accurate spacing to be maintained between the photoconductor belt and cooperating elements of the various stations described above. For example, in such machines in which the image is focused on the belt from a light-emitting diode write-head, the depth of focus of the image is very small and must be accurately coincident with the belt surface to produce a sharp image on the belt, which requires correspondingly accurate support of the write-head assembly relative to the adjacent portion of the belt. The criticality of such spacing depends somewhat on the type of station involved, but is an important consideration for most or all of the various stations.

In many electrophotographic copying or printing machines known in the prior art, the film core and the various stations associated with it are all mounted to the frame or housing of the machine and, while they may be adjustable relative to the frame or housing and to each other, they are all rigidly connected to the frame or housing once such adjustments have been made. Consequently, any subsequent distortion of the frame or housing imparts corresponding distortion or displacement to the film core and/or to the various stations, and can therefore negate previous adjustments. Similarly, if the film core itself is distorted following such adjustments, it is inevitable that its cooperation with one or more stations will be impaired.

In some constructions in which the film core is supported rigidly with respect to the machine frame, one or more of the various stations is positioned by the film core itself, which tends to alleviate the foregoing problem. However, it is impractical to locate the transfer drum in this manner because of its relatively large size and mass. Furthermore, distortion of the machine frame can still impart corresponding distortion to the film core itself, thereby influencing the transverse or lateral position of the belt with respect to the various stations. If the frame imparts distortion to the film core in a dynamic or periodic fashion, for example because of a vibrational harmonic in the machine, even a belt-tracking mechanism employing a sensor and a servo operated belt steering system may not be able to compensate for such influences.

SUMMARY OF THE INVENTION

In accordance with the present invention, the film core of an electrophotographic copying or printing machine is mounted to the machine frame by support means that prevent distortion of the frame from imparting distortive forces through the support means to the film core, and vice versa and those stations that must be accurately positioned with respect to the photoconductor belt of the film core are similarly supported to the film core such that distortion of the machine frame or housing cannot influence such positioning.

DESCRIPTION OF THE ILLUSTRATIVE PREFERRED EMBODIMENT

The illustrative preferred embodiment of the invention is illustrated and described with reference to a film core that is intentionally distorted by an adjusting mechanism for purposes of controlling the path of the photoconductor belt, as described in my above-referenced commonly assigned copending U.S. Pat. application Ser. No. 420,000. However, it should be understood that the present invention is equally applicable to machines in which the film core is not intended to be distorted.

Figure 1:
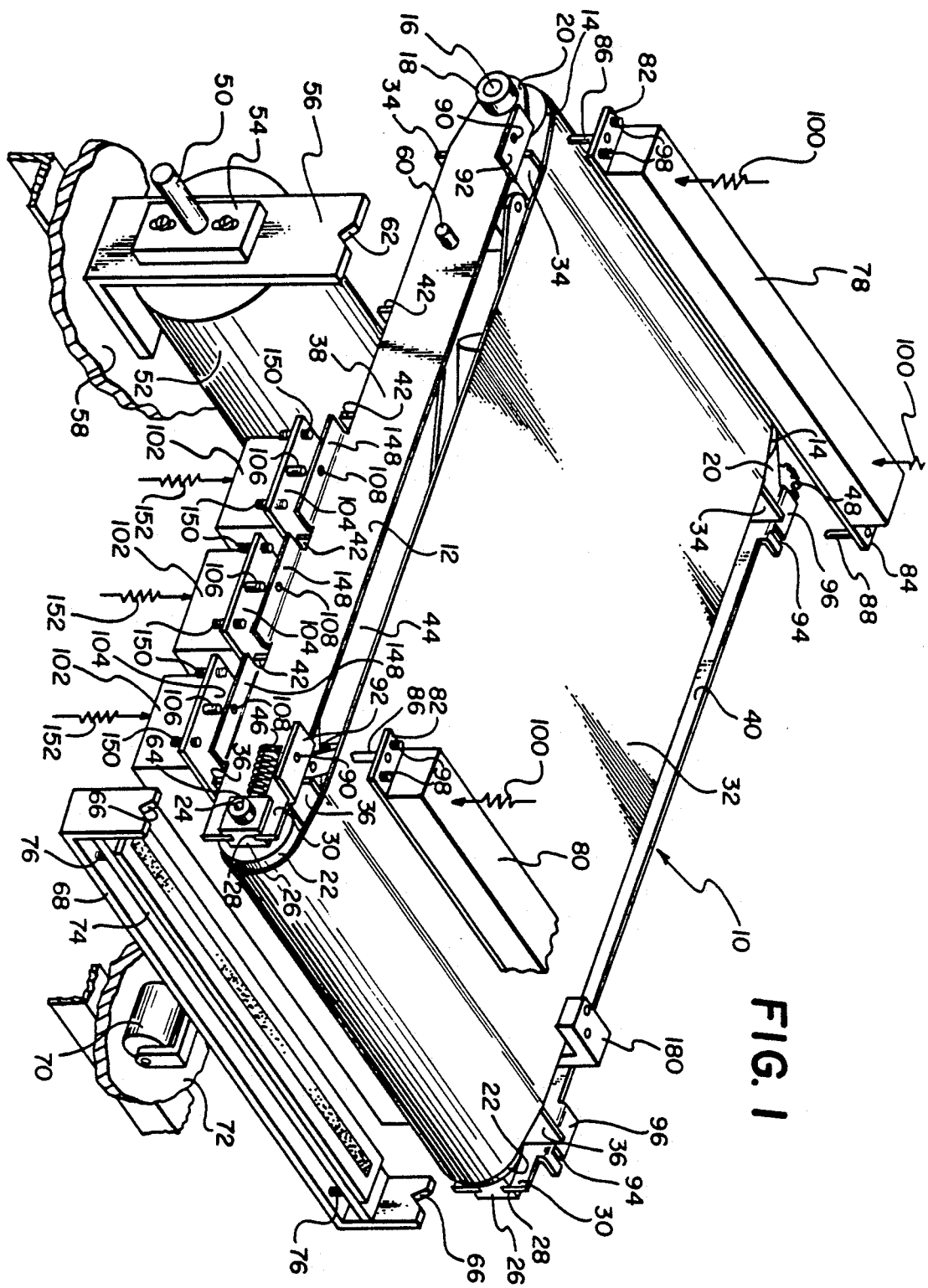
FIG. 1 is a perspective view of a preferred embodiment of the present invention comprising a film core and the means by which the core cooperates with other elements of an electrophotographic copier machine.

The apparatus shown in FIG. 1, which constitutes the basic elements of an electrophotographic copier, includes a film core 10 comprising a box-like frame 12, a driving roller 14 rotatably supported by shaft 16 between bearings 18 carried by frame ears 20 and a pivotable steering roller 22 rotatably supported by shaft 24 in bearing blocks 26, which are slidably mounted in slots 28 of frame ears 30 at the other end of the frame. An endless photoconductor belt 32 enwraps rollers 14 and 22 and is supported between the rollers by the flat upper and lower edge surfaces of frame end plates 34 and 36, extending between side plates 38 and 40 and along the lower belt run by transverse frame bars 42 below the lower wall member 44 of the film core frame. A spring 46 in each of the bearing support slots 28 engages the corresponding bearing block 26 to resiliently tension belt 32. A gear 48, or other suitable power transmission device, is attached to roller shaft 16 and engages an appropriate drive mechanism, not shown, to rotate driving roller 14 in a clockwise direction, as viewed in the drawings, thereby causing the belt to likewise travel in a clockwise direction so that it moves across the top of the core frame from roller 14 to roller 22.

Below the end of the film core adjacent driving roller 14, the center shaft 50 of a transfer drum 52 is rotatably supported at both ends by adjustable bearing blocks 54 carried by support brackets 56 attached to plate 58 of the machine frame. The corresponding end of the film core is supported above drum 52 by cylindrical studs 60 on side plates 38 and 40, which are received in corresponding V-notches 62 in brackets 56. Only one of the support brackets 56 is shown in FIG. 1, the other being substantially identical at the opposite end of drum 52, as shown schematically in FIG. 3. Drum 52 is driven in a counterclockwise direction appropriate by drive means, not shown, to correlate the peripheral speed of the drum with that of belt 32 so that a sheet or web of paper carried by the transfer drum contacts belt 32 between end plate 34 and the adjacent bar 42 and moves in synchronism with the belt to transfer an image from the belt to the paper. Alternatively, the image may be transferred to the transfer drum itself and then subsequently transferred to the paper or to some other receiver material.

At opposite ends of steering roller 22, bosses 64 of bearing blocks 26, concentric with roller shaft 24, are received in corresponding V-notches 66 of yoke member 68, which is provided with a central support roller 70 that rests on plate 72 of the machine frame. A light-emitting-diode write-head unit 74 is adjustably supported to yoke member 68 by adjusting screws, two of which are shown at numeral 76, to selectively illuminate the portion of the photoconductor belt supported by steering roller 22. Although the write head unit 74 is shown below roller 22 for purposes of clarity, the write head unit can be adjustably supported by yoke member 68 in a vertical position to project an image on the transverse exposure region of the belt centrally located with respect to the portion of the belt encircling roller 22.

As will be described later, the film core is resiliently biased downwardly into its supported engagement with brackets 56 and yoke member 68. Accordingly, the film core is supported to the machine frame by a three-point suspension comprising studs 60 and yoke roller 70, which cannot transmit distortive forces from the machine frame to the film core or vice versa. Also, because drum 52 is adjustable relative to brackets 56 and the write-head unit 74 is adjustable relative to yoke member 68, the critical positioning of the transfer drum and the write-head unit with respect to the adjacent portions of belt 32 is not in any way dependent on the accuracy or dimensional stability of the machine frame or the film core structure.

Above the photoconductor belt, a cleaning station unit 78 is positioned in alignment with end plate 34 and a charging station unit 80 is positioned in alignment with end plate 36. Each of these units is provided with support tongues 82 and 84, which, respectively, support guide pins 86 and 88. Guide pins 86 are received in holes 90 in the corresponding support ears 92 of frame side plate 38 and pins 88 are similarly received in slots 94 in the corresponding support ears 96 of frame side plate 40. Two adjusting screws 98 are provided at opposite sides of each of the pins 86 and a single adjusting screw, not shown, is provided near the center of each support tongue 84. Accordingly, these units are likewise supported to the film core at three points to isolate distortive influences of the units on the core or vice versa and to insure accurate spacing of those units relative to the belt. The cleaning and charging station units are biased downwardly by springs 100 to maintain those units in their adjustable relation to the photoconductor belt and to seat the film core in supported engagement with the V-notches of brackets 56 and yoke member 68. Preferably, the springs 100 movably attach the cleaning station and the charging station units to a movable top cover of the machine, not shown, so that opening the cover automatically raises those units out of engagement with the film core.

Below the film core, three toner applicator units 102 are each similarly provided at each end with end support tongues as shown at numeral 104, each of which is provided with a guide pin 106 receivable in a corresponding hole or slot 108 in lower support ears 148 on the film core frame and with adjusting screws 150 similar to those described above in connection with the cleaning and charging stations to achieve the same type of distortion isolation and spacing accuracy. Each toner station is located below a span of the belt defined by two adjacent bars 42 or the endmost bars and end plates 34 or 36. Springs 152 movably support the toner station units to the machine frame, thus biasing those units into engagement with the film core while allowing the latter to be conveniently raised out of engagement with the toner units. The strength of springs 100 and 152 are selected such that, in cooperation with the relative weights of the various components, they provide a net downward force on the film core to seat it positively in supported engagement with brackets 56 and yoke member 68.

Figure 2:
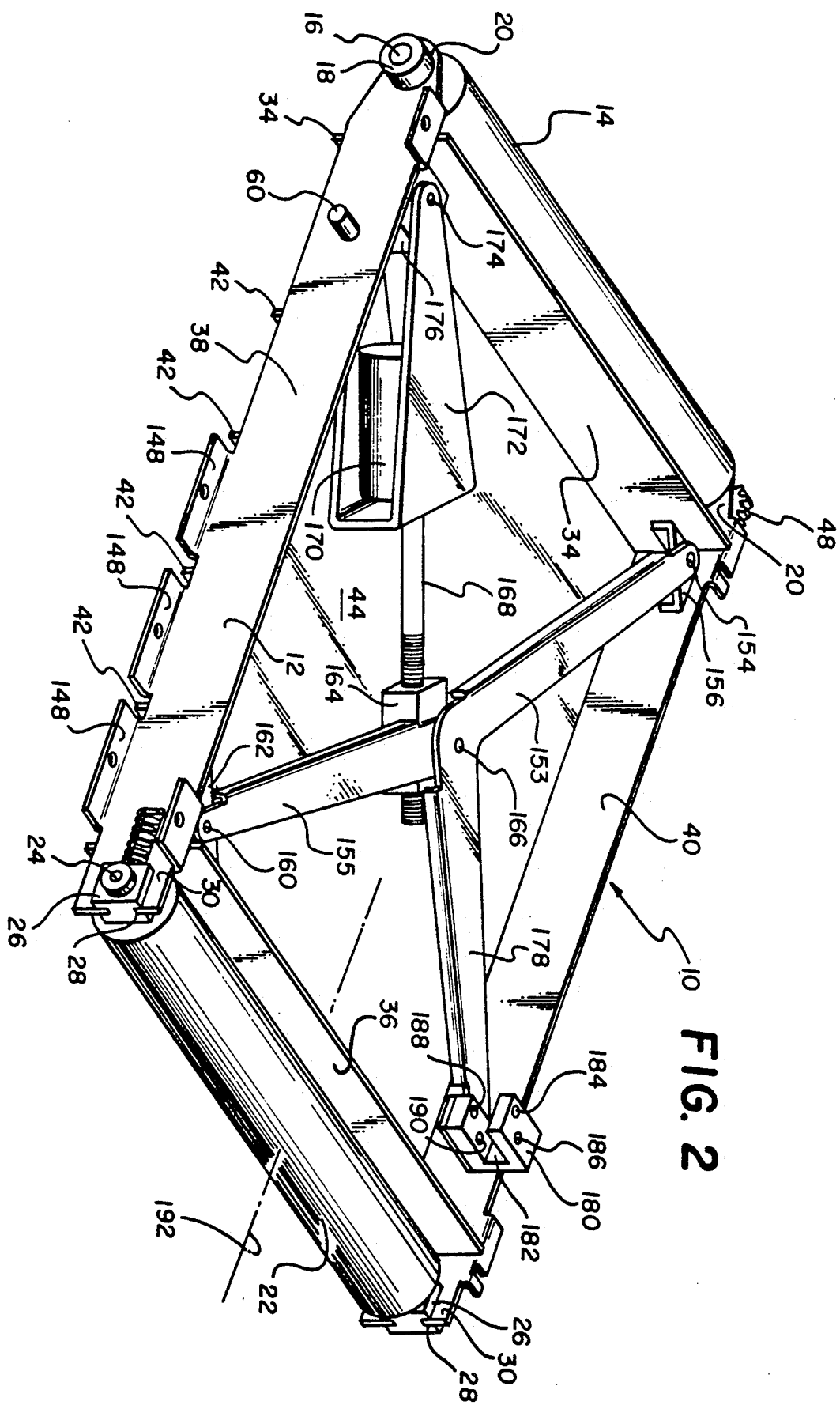
FIG. 2 is a perspective view of the film core alone with the photoconductor belt removed to illustrate internal components.

FIG. 2 illustrates the film core 10 with the photoconductor belt removed to depict the internal film core components, and shows the five-sided box-like configuration of the film core frame defined by side plates 38 and 40, end plates 34 and 36 and bottom wall plate 44.

A toggle lever 153 is pivotally attached by pin 154 to bracket 156 at one corner of the box-like frame adjacent drive roller 14 and near the open face of the frame and another toggle lever 155 is similarly pivotally attached by pin 160 to a corresponding bracket 162 at the corner of the film core frame diagonally opposite bracket 156. At the center of the film core frame, the two toggle levers are pivotally connected to each other and to a nut block 164 by a pin 166. A rod 168, provided with right-hand threads, extends through nut block 164 and is driven by a reversible gear reduction motor 170, carried in a support yoke 172 pivotally mounted by pin 174 to bracket 176 at the end of end plate 34 opposite pivot pin 154 and adjacent the drive roller 14. An arm 178 of toggle lever 153 supports an edge sensor unit 180, including a notch 182 between light-emitting diodes 184 and 186 and corresponding photoreceptors 188 and 190, which provide two edge detectors. The edge of the photoconductor belt 32 is received in notch 182, as shown in FIG. 1. Photoreceptor 188 senses the edge of the belt when its lateral or cross-track movement away from the sensor unit brings the edge partially out of obscuring alignment with that photoreceptor and photoreceptor 190 likewise senses the edge of the belt when its lateral or cross-track movement toward the sensor unit brings the edge partially into obscuring alignment with that photoreceptor; whereby the edge sensor unit defines a so-called "dead band" region or path, within which the belt edge obscures photoreceptor 188 but does not obscure photoreceptor 190.

Figure 3:
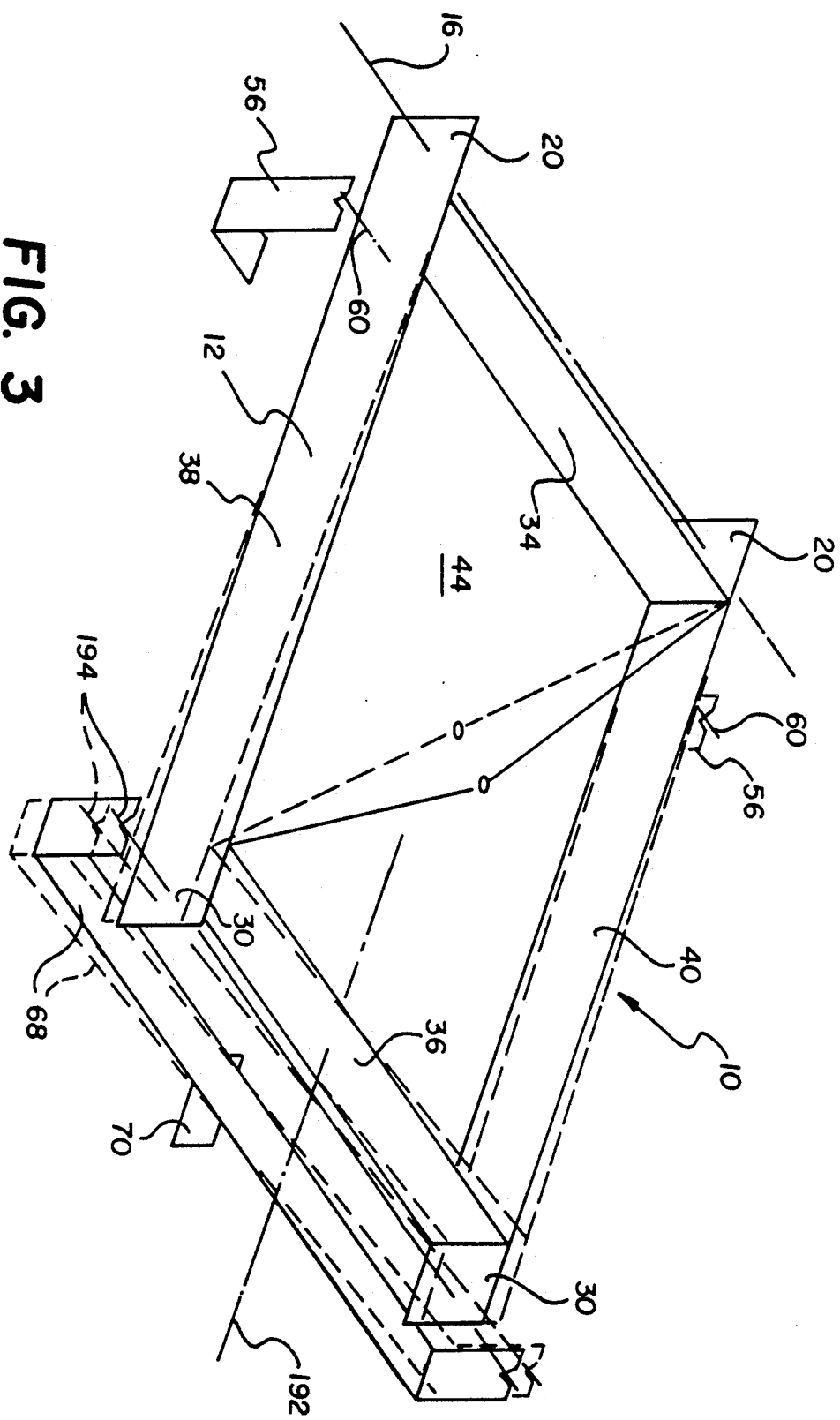
FIG. 3 is a schematic perspective view of the film core showing, greatly exaggerated, the manner in which the film core is distorted to effect belt steering pivotal movement of the steering roller.

As shown in FIGS. 2 and 3, the center toggle arm pivot pin 166 is offset from the center line of the outer end toggle arm pivot pins 154 and 160, so that movement of the center pivot toward motor 170 increases the distance between the end pivot pins 154 and 160 and thereby the distance between the corresponding corners of the box-like frame structure. As shown in broken lines in FIG. 3, this increased dimension and the resulting distortion of the frame 12 causes it to twist and thereby pivot steering roller 22 in a counterclockwise direction about steering axis 192, which extends lengthwise of the film core frame and passes perpendicularly through the center axis 194 of the steering roller in generally parallel relation to the flat portions of photoconductor belt 32. As mentioned previously, the illustrated distortion of the film core in FIG. 3 is very greatly exaggerated for purposes of clarity, the actual movement of the roller required to maintain the belt within its "dead band" range of positions being very slight.

Assuming that the belt is moving in a clockwise direction within its "dead band" and with a small cross-track velocity component away from the edge sensor unit 180, the edge of the belt received in sensor notch 182 will eventually be detected by photoreceptor 188 which will energize the motor to rotate clockwise, as viewed from the motor toward nut block 164, thereby causing the threaded rod 188 to pull nut block 164 toward the motor to impart counterclockwise rotation to the roller 22 about its steering axis; thus reducing the lateral or cross-track velocity of the belt. At the same time, the rotation of toggle lever arm 178 in a clockwise direction about pivot pin 154, causes the sensor unit 180 to move toward the belt. Consequently, the edge of the belt is again within the dead band region between the two photoreceptors 188 and 190, which causes the motor to stop. If this adjustment is not sufficient to eliminate the cross-track movement of the photoconductor belt in that direction, the edge of the belt eventually will again be detected by photoreceptor 188 and the same adjustment will again be repeated. Ultimately, such adjustment will eliminate and reverse the direction of cross-track movement of the photoconductor belt, whereupon photoreceptor 190 will eventually be energized; causing motor 170 to rotate counterclockwise and thereby reversing the adjustment of the steering roller so that the belt is now tending to move toward the sensor unit 180, which, at the same time, is moved slightly away from the belt to again establish the "dead band" condition. Accordingly, the belt is caused to continuously run within its predetermined "dead band" range of cross-track positions with very low cross-track velocity.

Although the adjusting means employed in the illustrative embodiment of the invention is carried by the film core and imparts a twisting distortion to the core by increasing a diagonal dimension, it should be understood that other types of adjusting means could be employed. If such an adjusting device is connected between the core and the machine frame, distortion of the machine frame may be capable of imparting a distortive force to the core through the adjusting device, but this does not violate the distortion isolation concepts of the invention because the belt position sensor automatically compensates for such distortion in the same manner as if it were produced by an adjusting device carried by the core frame.

The invention has been described in detail with particular reference to a presently preferred embodiment, but it will be understood that variations and modifications can be effected within the spirit and scope of the invention.

What is claimed is:

1. In an electrophotographic machine having a frame, a film core carrying an endless photoconductor belt engaged with at least two rollers and a plurality of stations cooperative with said photoconductor belt, the improvement comprising support means supporting said film core to said frame, said support means incorporating the principle of three-point suspension to maintain said film core in predetermined spatial relation to said frame while preventing distortion of said frame from imparting force to said film core through said support means, and said support means comprising first and second support members supported from said frame in spaced relation to each other and respectively engaging opposite sides of said film core and a third support member comprising a two-ended yoke engaged at its opposite ends with respective opposite sides of said film core and supported from said frame between said opposite sides of said film core, with one of said stations comprising a write-head adjustable supported by said yoke.

2. An electrophotographic machine having a supporting structure, a two-ended film core structure carrying an endless photoconductor belt engaged with at least two rollers each located at substantially opposite ends of the core structure, and a plurality of stations supported by said film core structure, said film core structure maintaining a fixed distance between said at least two rollers, said supporting structure comprising:
   means for supporting the film core structure at a first point on one side of the core structure and at a second point on an opposite side of the core structure, both supporting points being adjacent to the first end of the core structure;
   a yoke supporting the film core structure at third and fourth points on opposite sides and adjacent to the second end of the core structure;
   a rigid frame member to which the film core structure supporting means is attached; and
   means for supporting the yoke from the rigid frame member, said yoke supporting means providing restraint upon the movement of the film core structure in only one dimension.

3. The electrophotographic machine of claim 2 wherein the machine includes a rotatable drum attached to the film core structure supporting means, said drum being usable in transferring toned images to a receiver sheet.

4. The electrophotographic machine of claim 2 wherein at least one of the stations supported by the film core structure is a toner station which is operable to apply toner to a latent image on the photoconductor belt.

5. The electrophotographic machine of claim 2 wherein a write-head for selectively illuminating the photoconductor belt is adjustable supported by said yoke.

* * * * *